United States Patent [19]

Kezer et al.

[11] Patent Number: 5,258,587

[45] Date of Patent: Nov. 2, 1993

[54] ESTIMATING ELEVATOR PASSENGERS FROM GENDER RATIOED WEIGHT

[75] Inventors: Jeremy B. Kezer, Farmington; Bertram F. Kupersmith, Avon; David J. Sirag, Jr., South Windsor, all of Conn.

[73] Assignee: Otis Elevator Company, Farmington, Conn.

[21] Appl. No.: 927,039

[22] Filed: Aug. 10, 1992

[51] Int. Cl.⁵ .................... B66B 1/18; G01G 19/14
[52] U.S. Cl. .................... 181/131; 187/138; 364/567
[58] Field of Search ............... 187/131, 124, 138, 132, 187/130; 364/567, 568

[56] References Cited

U.S. PATENT DOCUMENTS

| | | | |
|---|---|---|---|
| 4,536,842 | 8/1985 | Yoenda et al. | 364/424 |
| 4,874,063 | 10/1989 | Taylor | 187/130 |
| 4,951,786 | 8/1990 | Haraguchi | 187/1 R |
| 5,022,498 | 6/1991 | Sasaki et al. | 187/127 |
| 5,054,585 | 10/1991 | Amano | 187/124 |

FOREIGN PATENT DOCUMENTS

| | | | |
|---|---|---|---|
| 0511904 | 11/1992 | European Pat. Off. | 187/130 |
| 0270784 | 11/1990 | Japan | 187/131 |

*Primary Examiner*—Steven L. Stephan
*Assistant Examiner*—Robert Nappi

[57] ABSTRACT

For any given sensed load weight in an elevator car, the union (30-36) of a fuzzy set (FIG. 2) indicative of the likelihood of possible number of male passengers causing the sensed weight, taking into account the relative mix of males in the total population of the building (12-22) with a fuzzy set (FIG. 4) indicative of the likelihood of possible number of female passengers causing the sensed weight, taking into account the relative mix of females in the total population of the building (14-24), forms a passenger count fuzzy set (FIG. 5) indicative of the likelihood of a given number of passengers corresponding to each sensed or discernible elevator load weight for use in dispatching of elevator cars. A lookup table may be established (FIG. 7) for all possible weights.

8 Claims, 3 Drawing Sheets

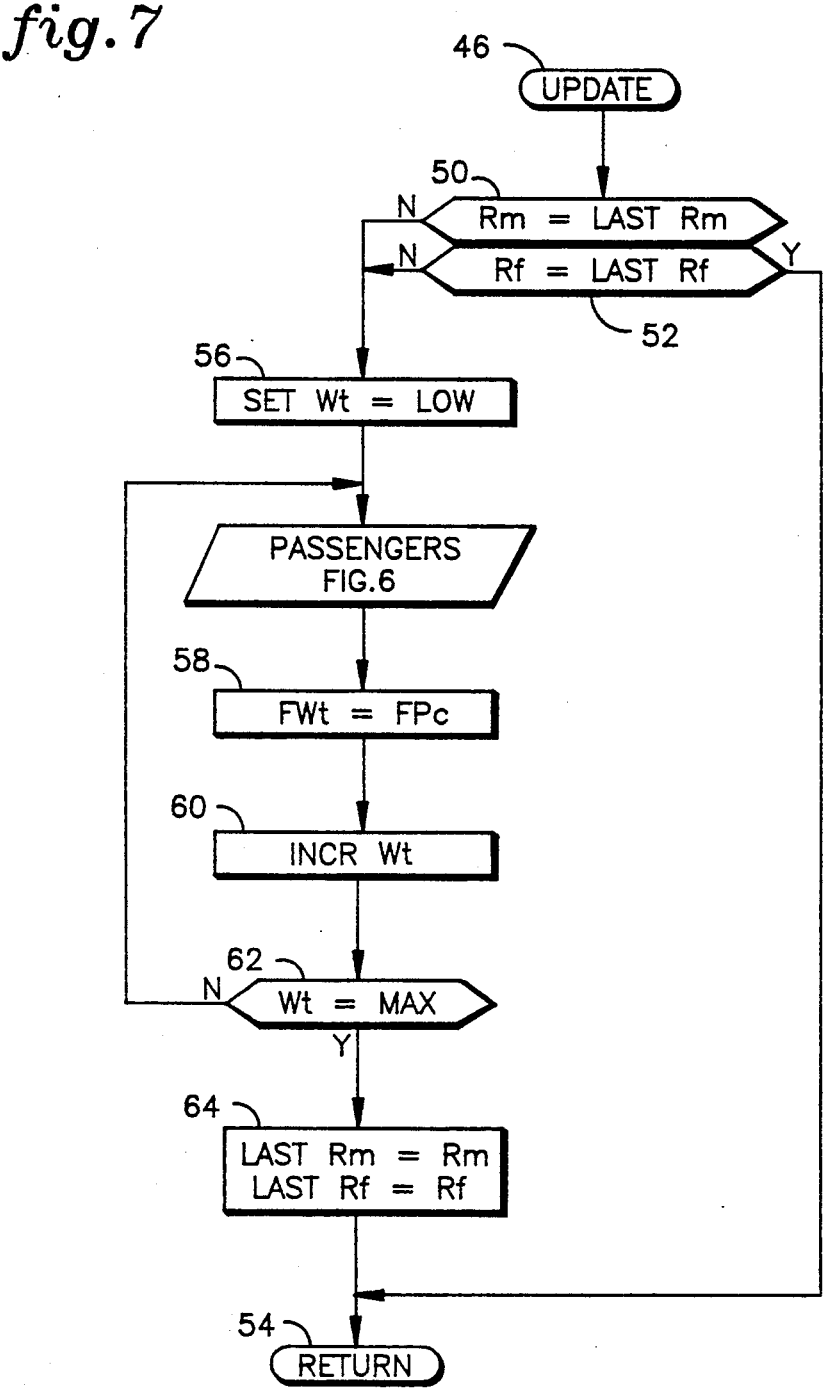

ESTIMATING ELEVATOR PASSENGERS FROM GENDER RATIOED WEIGHT

TECHNICAL FIELD

This invention relates to estimating the number of passengers in an elevator car based upon weight which takes into account the difference in weight between men and women.

BACKGROUND ART

In order to dispatch elevator cars in a manner which provides most effective service to elevator passengers, various methods employ the number of passengers in an elevator car as a key factor. Typical examples are determining if a large number of passengers are leaving the lobby floor during the morning rush hour, in which case an up-peak mode of dispatching would be initiated; similarly with respect to downwardly traveling passengers arriving at the lobby floor during the evening rush hour, which may invoke a down-peak mode of dispatching. An example can be found in U.S. patent application Ser. No. 07/879,558 filed on May 4, 1992 by Sirag and Weisser, entitled "Using Fuzzy Logic to Determine the Traffic Mode of an Elevator System". In said application, the number of passengers is determined using fuzzy logic in a manner which is described therein, and which is also described and claimed in a commonly owned, copending U.S. patent application Ser. No. 07/879,528 filed on May 4, 1992 of Sirag, entitled "Using Fuzzy Logic to Determine the Number of Passengers in an Elevator Car" (both applications are incorporated herein by reference). That method utilizes a large amount of data indicative of the variations in weight which various numbers of people (such as two people, eleven people, twenty-eight people) might weigh in a given elevator system. The data can be obtained empirically by simply observing the number of people in an elevator car and recording that number with the weight indicated by the elevator load weighing system at that time. After collecting large amounts of data, the various weights for any given passenger count can be strung together to form a fuzzy set in which each basis element is a discernible weight for the elevator and the membership for each basis element is dependent on the number of times (normalized) that such weight has been observed. Then, to use the data, for any given weight, a fuzzy set is established which is the membership for that weight basis element within each of the fuzzy sets relating to all possible numbers of passengers. Thus, a slice through those fuzzy sets representing weights for numbers of passengers, results in a single fuzzy set of passengers for a given weight, in which each basis element is a number of passengers and the membership of that basis element is the likelihood that that number of passengers will result in the given weight of the set.

There are other ways to determine the number of people in an elevator car, particularly those that use discrete people counters, such as infrared and video techniques of which many are known. However, these can be quite expensive and still are not absolutely foolproof in terms of providing an absolutely accurate count of the number of people that enter or leave an elevator car. In the methodology of the aforementioned Sirag application, if suitable information is acquired empirically, it must present a very accurate prediction of the average number of people at a given weight. On the other hand, the discreet people counters are more likely to present actual rather than average data, but they have been shown to be inaccurate.

DISCLOSURE OF INVENTION

Objects of the invention include improved determination of the number of passengers within an elevator car.

This invention is rooted in the notion that at any given point in time, the loading of an elevator car is not average, but is distinct. Unless the data is acquired periodically in each individual building, it is subject to even more error. One of the reasons for this is that the percentage of male and female population of any given building may vary considerably from one or more other buildings where data were acquired. Therefore, the numbers of people for a given load of an elevator will similarly vary from building to building. A precept of the invention is to avoid the need for a large amount of empirical data in a given building by taking into account the thing that varies most from one building to the next; the male/female population mix in the building. While this mix may change over a period of time, it usually changes relatively slowly, only by small amounts (for dispatching), and only occasionally may change significantly. Thus, the invention accommodates the greatest variant in elevator load weight between different buildings without having to empirically determine that variation in weight on a building-by-building basis.

The invention is predicated on the fact that the greatest variation in the likely number of people per elevator car load between various buildings is a function of the male/female mix in the diverse buildings.

According to the present invention, methods of dispatching elevator cars utilize fuzzy sets indicative of the likely number of male passengers and the likely number of female passengers for any given measured weight of an elevator car load, are utilized in accordance with the relative likelihood of the passengers being male or female, respectively, so as to provide a more accurate, less averaged determination of the number of passengers indicated by the elevator car load weight, and therefore improved dispatching. In accordance further with the present invention, the building population of male and female occupants is utilized to adjust the estimate of the number of passengers for a given load weight. According to the invention still further, a fuzzy set indicative of the likely number of male passengers for a given elevator weight has the memberships of each basis element adjusted by the ratio of male building occupants to the total building occupants, and a fuzzy set indicative of the likely of number of female passengers resulting in a given elevator weight has the memberships of each basis element adjusted by the ratio of female population to total population of the building, and the union of the two sets is then taken to provide a fuzzy set indicative of the likelihood of the possible number of passengers causing the elevator car load weight which has been sensed. Crisp values and table lookup are also provided.

The present invention is readily implemented utilizing programming techniques and apparatus readily available in the art, in light of the teachings which follow hereinafter.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1—male passengers,
FIG. 2—male passengers ratioed for population,
FIG. 3—female passengers,
FIG. 4—female passengers ratioed for population, and
FIG. 5—a union of the fuzzy sets in FIGS. 2 and 4;
FIG. 7 is a simplified logic flow diagram of an update passengers routine practicing the present invention.

BEST MODE FOR CARRYING OUT THE INVENTION

Figure 1:
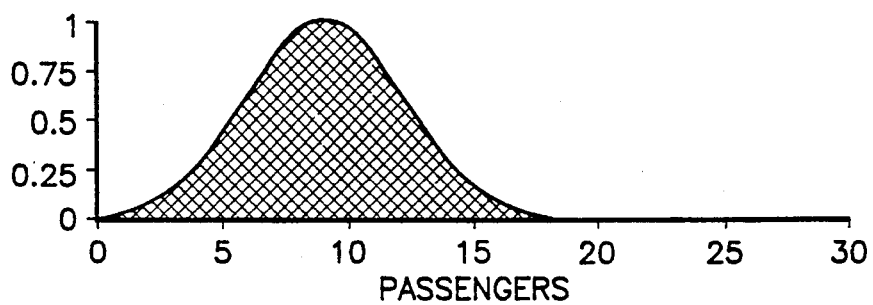
FIGS. 1-5 are illustrations of fuzzy sets for a given weight representing.

Referring now to FIG. 1, a fuzzy set indicative of a likelihood of there being a certain number of male passengers in an elevator car for some given elevator car load weight is shown. The load weight can be in terms of pounds (Lbs) or kilograms (Kgm), or it can be in terms of percentage of rated elevator car load (e.g., 42% of full load). Such details are chosen to suit the programming in an expeditious fashion. As set forth in the aforementioned application of Sirag, the data necessary to acquire a series of fuzzy sets, each one relating to a possible elevator load, includes the process of determining empirically the weight which a given number of male passengers will yield. If empirical data concerning males cannot be achieved, empirical data concerning a mix of males and females, on average, may be utilized, and then adjusted using statistical, demographic data about populations of males and females in general to reflect how many males would cause such likelihoods vs. how many passengers of mixed male and female population on average would cause such likelihoods. Alternatively, the requisite fuzzy sets may be developed strictly from available demographics on the population, with or without empirical adjustment in an actual elevator installation. In any event, a plurality of fuzzy sets are provided, each one relating to a discernible elevator load weight, each having a plurality of basis elements, each basis element relating to a given number of male passengers, and the membership of each basis element being the likelihood that the weight includes a given number of male passengers (FIX).

Figure 3:
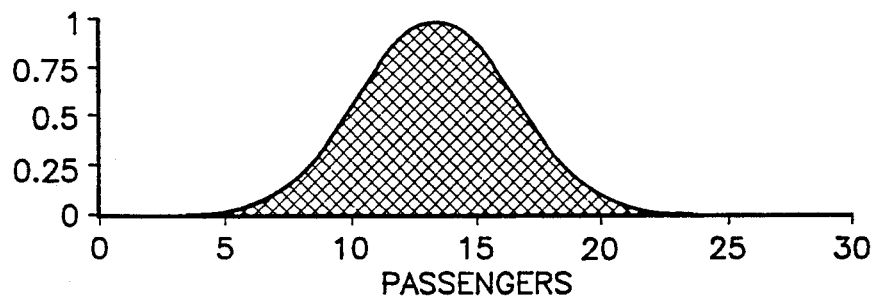

The illustration in FIG. 1 might, for instance, be the fuzzy set for an elevator load weight of 1350 Lbs (612 Kgm) or 42% of rated load for an elevator having a rated load of 3200 Lbs (1450 Kgm). Assuming FIG. 3 is for the same load weight or percentage of rated load, there is, as expected a greater likelihood of more female passengers than the number of male passengers indicated as likely in the fuzzy set of FIG. 1. For instance, the peak membership value of males is around nine whereas the peak membership value for a same weight of females is around thirteen, in the example of FIGS. 1 and 3.

Figure 2:
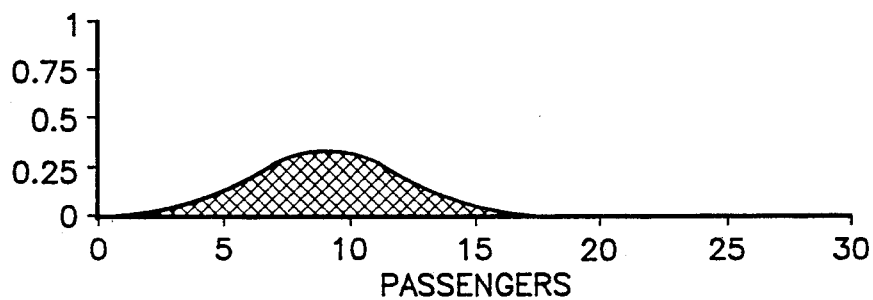
Figure 4:
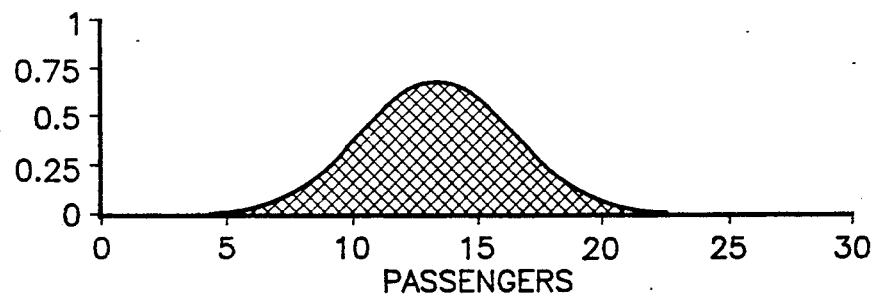

Assume that the normal population of a building is 33% male and 67% female, which might be true for a building having a high clerical function, such as an insurance company headquarters. In accordance with the invention, the male fuzzy set selected for the current elevator load set forth in FIG. 1 then has its basis elements adjusted by being scaled by 0.33 so as to result in the fuzzy adjusted set illustrated in FIG. 2. As a corollary, the female fuzzy set for that elevator weight is adjusted by having the membership values thereof scaled by 0.67 to result in the adjusted fuzzy set of FIG. 4. In accordance with the invention, the union of the fuzzy sets of FIGS. 2 and 4 is taken. The union is simply the larger of the two membership values for each basis element. The union of the fuzzy sets of FIGS. 2 and 4 (after normalizing), illustrated in FIG. 5, can then be used for any elevator dispatching purpose which requires a fuzzy set of number of passengers in the elevator car.

Figure 5:
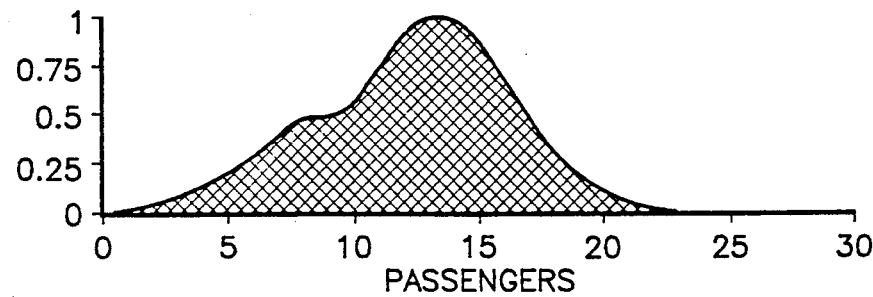

If the processing cannot utilize a fuzzy set of number of passengers, but rather needs a crisp value thereof, then the crisp value of the fuzzy set of FIG. 5 is preferably obtained by determining the "center of gravity" thereof; that is, selecting a number of passengers which best represents the center of gravity of the fuzzy set. In the fuzzy set of FIG. 5, the center of gravity would be a slightly lower number of passengers than the number of passengers with the maximum membership value, thirteen, such as on the order of eleven passengers or so. The center of gravity basis element is determined by multiplying etc.) by the corresponding membership values (0.01, 0.03, etc.), summing all of the products and then dividing by the summation of the membership values. Providing the union of two fuzzy sets, normalizing and determining the center of gravity crisp value are all well known in the art of fuzzy logic.

In a simple embodiment of the present invention, there may be included 30 fuzzy sets, representing 0-29 passengers, each having 250 basis elements, representing discernible load weights of between 0 and 4800 pounds (2200 Kgm) or so. Each fuzzy set represents a series of numbers, the magnitude of which is the membership value of a basis element, and a position of the number in the overall word being indicative of the basis element (the number of passengers) which the membership represents. For any given sensed load weight, which may typically be sensed at the time that the elevator doors close and an elevator is departing from a landing, the processing of the present invention may be practiced to provide a determination of the number of passengers in the elevator. In the exemplary passengers routine of FIG. 6, which is reached through an entry point 10, a process is shown to first adjust the memberships in the male fuzzy set, then adjust the memberships in the female fuzzy set, to accommodate the male/female mix of the population, and then combine the two fuzzy sets by taking the union thereof. In a series of steps 12, a male fuzzy set, Fm, is set equal to the predetermined male fuzzy set for the sensed elevator car load weight, F(Wt, MALE). And, a ratio value, R, is set equal to the ratio Rm of male population to total population in the building in which the invention is being practiced; and then, a male flag (as used hereinafter) is set. Following that, a passenger point (P PTR) is set equal to zero in a step 14. The membership value for the basis element P of the male fuzzy set for the current load weight is multiplied in a step 15 by the ratio of male population to total population (R). Then the P pointer is advanced in a step 17 and a test 19 determines if the membership values for all basis elements of the current fuzzy set (for the measured weight) have been adjusted for male building population. Initially, they will not, so a negative result of test 19 will return the program to step 15 where the next membership value for the given weight for male population is multiplied by the male ratio and the P pointer is advanced in the step 17. Eventually, the P pointer will have advanced to 30 and the last membership value will have been adjusted in the step 17. Then an affirmative result of the test 19 will reach a test 22 which determines whether the male flag is currently set or not. In the first pass from the test 19, the test 22 will be affirmative reaching a series of steps 24 wherein a female fuzzy set, Ff, is set equal to the predetermined female fuzzy set for the sensed elevator car load weight, F(Wt, FEM); the ratio is set to the ratio, Rf, of females to the total population, and the male flag is reset. Then the process is repeated until all of the membership values for each of the basis elements representing female passengers between 1 and 30 have been ratioed in accordance with the relative number of females in the building population. When that has been done, an affirmative result of test 19 will reach the test 22 which will now produce a negative result because the male flag was reset in the steps 24. Then a step 26 again sets the P pointer equal to zero in preparation for taking the union (or overlay) of the male and female sets. A test 30 determines whether the membership value for P equals one male is equal to or greater than the membership value for P equals one female (as determined in the passes through step 15 as described hereinbefore). If the male value is equal to or greater than the female value, the membership value, Pp, in the final passenger count fuzzy set is set equal to the membership value, Mp, in the adjusted male fuzzy set as a result of an affirmative result of the test 30 reaching a step 32. But if the female membership value is greater for the basis element of one passenger, then a negative result of the test 30 will reach a step 34 where the membership value of the final passenger count fuzzy set for one passenger is set equal to that for one female passenger. Then a step 28 advances the P pointer and a test 36 determines whether the union has been completed for all 30 passengers in the final fuzzy set, or not. Initially, it will not, so a negative result of test 36 will reach the step 30 where the process is repeated for two passengers. Eventually, the larger membership value for all the basis elements relating to passengers between 0 and 30 will have been selected in one of the steps 32, 34 and an affirmative result of test 36 will therefore reach a subroutine 38 in which the final passenger count fuzzy set for the given weight is normalized. Normalizing, as is well known, is achieved by multiplying each of the membership values by the ratio of its value to the summation of all of the membership values. If desired, a test 40 can determine if a crisp value of probable number of passengers for the given weight is desired for use in further processing. If it is, it can be achieved in the "center of gravity" subroutine 42 which will divide the summation of the products of the basis elements and their corresponding membership values by the summation of the membership values in the final, normalized passenger fuzzy set. Alternatively, the crisp value can simply be the basis element (number of passengers) in the passenger fuzzy set having the highest membership value. This will yield a basis element equaling the most likely number of passengers, both male and female, adjusted in accordance with the relative male/female ratios to total building population. With or without converting to a crisp value, the routine of FIG. 6 can be exited through a return point 44 so that other elevator dispatching routines can be reached, as in the aforementioned applications and as well known in the art.

Figure 6:
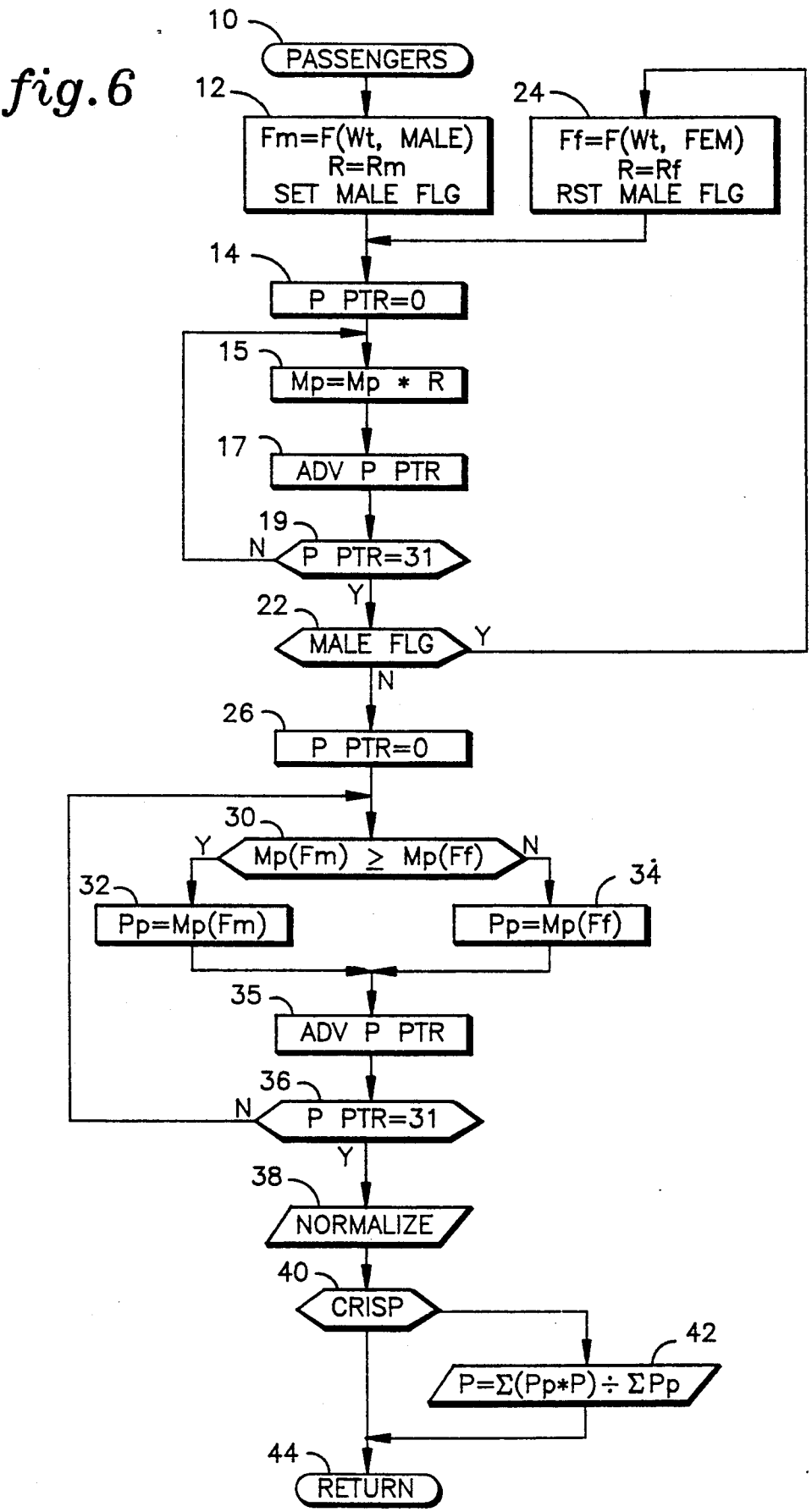
FIG. 6 is a simplified logic flow diagram of a passengers routine practicing the present invention.

If desired, the process of ratioing the male fuzzy sets and female fuzzy sets for any given ratio of male/female populations (tests and steps 12-24, FIG. 6) can be achieved for all of the possible discernible load weights, and the resulting union of sets (tests and steps 30-36; with resulting crisp value, if needed) stored so that these tests and steps need not be performed every time a new load weight is sensed; but rather, the program could simply look up the combined passenger count fuzzy set for the given load weight. This could be achieved by performing the tests and steps 12-38 any time that the ratio of male and female populations within the building (Rm, Rf) are to be changed in the weight-to-passenger processing of the present invention. Or, it could be updated once each day. This would take one-third more storage, but it would alleviate a lot of real time processing, since such ratios change at best only occasionally. In FIG. 7, an update routine can be reached through an entry point 46, such as once each day in the early morning hours when the elevator processors are not busy. If a first test 50 indicates that the male ratio is the same as it was the last time, then a test 52 determines if the female ratio is the same as the last time. If both ratios are the same as the last time the update routine of FIG. 7 was run, then an affirmative result of the test 52 will cause other programming to be reverted to through a return point 54. On the other hand, if either ratio has changed (strictly speaking, neither can change unless both do) then a negative result of one of the tests 50, 52 will reach a step 56 where a value of weight (Wt used in steps 12 and 24 of FIG. 6) is set equal to the lowest weight which the elevator car load sensors can discern (the lowest in the range of sensible weights). Then, the passengers routine of FIG. 6 is run for the lowest weight which can be sensed. This provides a passenger count fuzzy set as a result of the test and steps 30-38 (FPc), and the fuzzy set for the lowest weight (FWt) is set equal to that passenger count fuzzy set in the step 58. Then a step 60 increments the weight value and a test 62 determines if all of the discernible weights, up to and including the maximum discernible weight have had fuzzy sets prepared utilizing the current male and female ratios. Initially this will not be the case, so a negative result of the test 62 will reach the passengers routine of FIG. 6 to determine a new passenger count fuzzy set for the second from lowest discernible weight. The process repeats itself for each resolvable weight of the elevator car load weighing systems, until an affirmative result of the test 62 indicates that passenger count fuzzy sets have been prepared and stored for all possible elevator load weights. Then, an affirmative result of test 62 will reach a pair of steps 64 in which the last male ratio is set equal to the current male ratio and the last female ratio is set equal to the current female ratio. And then other parts of the program are reverted to through the return point 54.

It should be noted that the passengers routine can be provided for each new load weight sensed, or each new load weight sensed can be utilized to access the fuzzy sets stored in the succession of steps 58. The choice is up to the particular utilization of the present invention, and does not affect the invention.

It should further be understood that details illustrated in FIGS. 6 and 7 are merely exemplary, and the overall processing of providing a combined fuzzy set which represents a suitable union of male passenger fuzzy sets and female passenger fuzzy sets in accordance with the male/female mix of building population can be achieved in many ways, depending on the particular utilization of the present invention in elevator dispatching.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. In a method of dispatching a plurality of elevators in a building, each of said elevators having a weight sensor for providing signals indicative of the elevator car load weight, the steps of:

providing a first plurality of predetermined sets of signals, each set relating to a given elevator car load weight between the lowest load weight which may be sensed and the maximum load weight which one of said elevator cars is designed to carry, each set having signals corresponding to a plurality of terms, each term including a basis element equalling a given number of male passengers and a corresponding degree of membership related to the likelihood that the number of male passengers will be present when the given weight corresponding to said set is measured as the load weight of one of the elevator cars;

providing a second plurality of predetermined sets of signals, each set relating to a given elevator car load weight between the lowest load weight which may be sensed and the maximum load weight which one of said elevator cars is designed to carry, each set having signals corresponding to a plurality of terms, each term including a basis element equalling a given number of female passengers and a corresponding degree of membership related to the likelihood that the number of female passengers will be present when the given weight corresponding to said set is measured as the load weight of one of the elevator cars;

providing a male ratio signal indicative of the ratio of the male population of said building to the total population of said building;

providing a female ratio signal indicative of the ratio of the female population of said building to the total population of said building;

providing weight signals, each indicative of a load weight of one of said elevator cars which may be involved in said method of dispatching;

providing for each of said weight signals a plurality of signals indicative of a male passenger count fuzzy set in which each term has a basis element equalling the number of male passengers of the corresponding term of said first predetermined set and a degree of membership which is the product of said male ratio and the degree of membership of said related term;

providing for each of said weight signals a plurality of signals indicative of a female passenger count fuzzy set in which each term has a basis element equalling the number of female passengers of the corresponding term of said second predetermined set and a degree of membership which is the product of said female ratio and the degree of membership of said related term;

providing for each of said weight signals a set of signals indicative of a passenger count fuzzy set which is the union of the corresponding male fuzzy set and female fuzzy set; and dispatching elevators to provide service in said building in response to a process using the signals of said passenger count fuzzy sets to provide corresponding representations of the number of passengers in said elevators.

2. A method according to claim 1 wherein said likelihoods are determined by observing the number of people in an elevator of the same type as said elevators at a number of times when the corresponding weight is measured as being the weight of such elevator.

3. A method according to claim 1 wherein said likelihoods are determined demographically.

4. A method according to claim 1 wherein said last step includes combining signals of any one of said passenger count fuzzy sets to provide a corresponding crisp signal indicative of a single crisp value of passenger count.

5. A method according to claim 4 wherein said crisp signal is indicative of the basis element of said passenger count fuzzy set having the highest degree of membership.

6. A method according to 4 wherein said crisp signal is provided by altering the signals of said passenger count fuzzy set representing each degree of membership by the ratio of its value to the sum of all their values, thereby normalizing said fuzzy set and then taking the ratio of the summation of the products of the value of the normalized degree of membership of each term and the value of the corresponding basis element of such term, to the summation of the values of the normalized degree of membership of all terms.

7. A method according to claim 1 wherein said last step includes altering the signals of said passenger count fuzzy set representing each degree of membership by the ratio of its value to the sum of all their values, thereby normalizing said fuzzy set.

8. A method of dispatching a plurality of elevators in a building, each of said elevators having a weight sensor for providing signals indicative of the weight thereof, comprising:

providing a first plurality of predetermined sets of signals, each set relating to a given elevator car load weight between the lowest load weight which may be sensed and the maximum load weight which one of said elevator cars is designed to carry, each set having signals corresponding to a plurality of terms, each term including a basis element equalling a given number of male passengers and a corresponding degree of membership related to the likelihood that the number of male passengers will be present when the given weight corresponding to said set is measured as the load weight of one of the elevator cars;

providing a second plurality of predetermined sets of signals, each set relating to a given elevator car load weight between the lowest load weight which may be sensed and the maximum load weight which one of said elevator cars is designed to carry, each set having signals corresponding to a plurality of terms, each term including a basis element equalling a given number of female passengers and a corresponding degree of membership related to the likelihood that the number of female passengers will e present when the given weight corresponding to said set is measured as the load weight of one of the elevator cars;

providing a male ratio signal indicative of the ratio of the male population of said building to the total population of said building; building a gender weighted passenger count fuzzy set table by performing the following steps:

a  providing a weight signal indicative of a first value of weight at one extreme of a range of weight which extends from the lowest weight to the maximum weight which said weight sensors of said elevators can provide b  providing a plurality of signals indicative of a male passenger count fuzzy set in which each term has a basis element equalling the number of male passengers of the corresponding term of the one o said first predetermined sets according to said weight signal and a degree of membership which is the product of said male ratio and the degree of membership of said related term;

c  providing for each of said weight signals a plurality of signals indicative of a female passenger count fuzzy set in which each term has a basis element equalling the number of female passengers of the corresponding term of the one of said second predetermined sets corresponding to said weight signal and a degree of membership which is the product of said female ratio and the degree of membership of said related term;

d  providing a set of signals indicative of a passenger count fuzzy set which is the union of said male fuzzy set and female fuzzy set;

e  storing said passenger count fuzzy set signals in a table at an entry corresponding to said weight signal;

f  providing a new weight signal indicative of a value of weight which is further from said one extreme than the value of the weight signal used in step b by the resolution of said weight sensors;

g  comparing said new weight signal to a signal indicative of the value of weight at the other extreme of said range, and if said new weight signal indicates a value within said range repeating steps b-g dispatching elevators to provide service in said building in response to a process using the weight signals provided by said weight sensors to access said table to provide signals of a corresponding passenger count fuzzy set for use as representations of the number of passengers in said elevators.

* * * * *